United States Patent [19]

Lawson

[11] Patent Number: 4,472,080

[45] Date of Patent: Sep. 18, 1984

[54] METHOD FOR INSTALLING AND CONNECTING UNDERWATER FLOWLINES

[75] Inventor: John E. Lawson, London, England

[73] Assignee: Armco Inc., Middletown, Ohio

[21] Appl. No.: 326,328

[22] Filed: Dec. 1, 1981

[51] Int. Cl.³ .................... E02D 5/62; E21B 15/02; E21B 43/013; F16L 1/04

[52] U.S. Cl. .................................. 405/169; 405/225; 166/347; 175/10

[58] Field of Search ............... 405/169, 195, 225, 226, 405/227; 166/338, 341, 342, 343, 344, 347, 362; 175/10, 7

[56] References Cited

U.S. PATENT DOCUMENTS

| | | | |
|---|---|---|---|
| 3,115,755 | 12/1963 | Siebenhausen | 405/225 |
| 3,298,092 | 1/1967 | Dozier et al. | 166/343 X |
| 3,378,066 | 4/1968 | Otteman et al. | 166/346 |
| 4,175,620 | 11/1979 | Nolan, Jr. et al. | 166/352 X |
| 4,216,835 | 8/1980 | Nelson | 175/7 X |

*Primary Examiner*—Cornelius J. Husar
*Assistant Examiner*—Nancy J. Stodola
*Attorney, Agent, or Firm*—Roylance, Abrams, Berdo & Goodman

[57] ABSTRACT

In installation of a flowline and connection thereof to an underwater installation equipped with guide lines extending from the installation to an operational base at the surface of the body of water, a pile or other upright support is first installed in a predetermined location adjacent the underwater installation, and all operations necessary to install the flowline and connect the flowline to the underwater installation are then carried out with the aid of the guide lines and employing apparatus installed on the pile.

7 Claims, 13 Drawing Figures

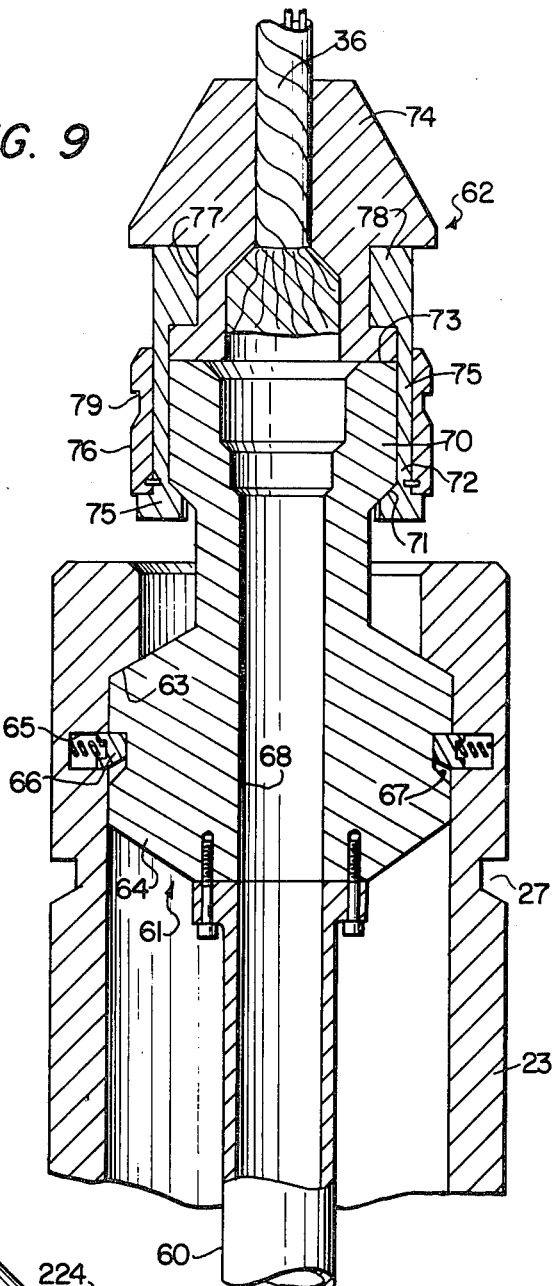
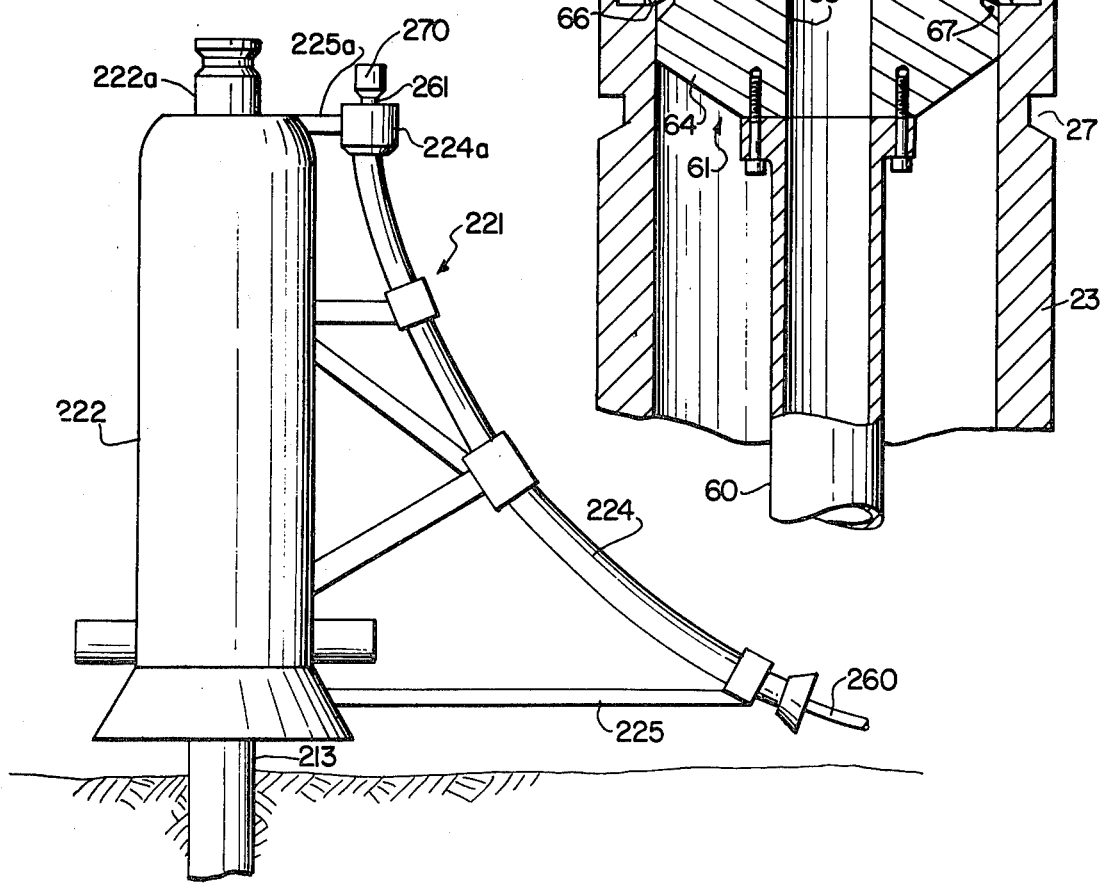
FIG. 9
FIG. 13

METHOD FOR INSTALLING AND CONNECTING UNDERWATER FLOWLINES

This invention relates to the installation of underwater flowlines and, in particular, provides a method for installing and connecting flowlines to an underwater structure, typically an underwater wellhead or an underwater production manifold.

RELATED APPLICATIONS

Subject matter disclosed in this application is also disclosed and claimed in my copending applications Ser. No. 326,330 and Ser. No. 326,333, filed concurrently herewith.

BACKGROUND OF THE INVENTION

Since the beginning of the art of installing oil and gas wells underwater, installation of the flowlines necessary to carry produced fluid away from the wellhead or to carry produced fluid to or processed fluid from, e.g., a manifold has presented a difficult problem. When wells were installed in shallow water, it was possible to practice methods and use connectors and other apparatus which could be directly manipulated by divers. As locations for wells and other installations began to present water depths beyond reasonable diver assistance capabilities, a number of approaches were adopted which provided for making up the connection between the flowline and, e.g., a wellhead by completely remote operations, carried out from a platform, a semi-submersible, a drilling vessel or other operational base at the surface of the body of water, without diver assistance. Most such approaches depend upon laying the flowline from a barge, one end of the line first being lowered to the bottom adjacent the installation to which connection is to be made, the barge then moving off location to lay the flowline on the bottom of the body of water. In some cases, the flowline end to be connected has been maintained in a vertically downward orientation while being lowered and has been stabbed into a connector part carried by the wellhead or other apparatus, orientation of the flowline relative to the connector part being maintained by conventional guide means. In other cases, a receiving funnel is provided at the installation where the flowline is to be connected and the end of the flowline is hauled into the funnel by a wireline, termination of the hauling operation serving to secure a male or female connector part carried by the flowline end. Such receiving funnels have in some cases been horizontally disposed, but greater promise has been offered by such approaches when the funnel is in the form of a J-tube with the end of the funnel which is to be entered by the flowline being approximately horizontal and the opposite end being upright. Though these and other methods and apparatus provided by the prior art have achieved acceptance in the field, the task of installing and connecting flowlines presents some problems which have not heretofore been solved completely, and there has been a continuing need for improvement.

Though remote installations under water inherently present severe problems, the problems of installing and connecting flowlines are made more difficult by the nature of the flowlines themselves. Since the flowline in most installations is in the form of a metal pipe of significant diameter, any bend in the pipe is necessarily of large radius. Thus, for a flowline 2 or 3 inches in diameter, the radius for any turn of the free line is on the order of 15-25 feet and, for a 6 inch flowline, the radius of curvature is typically 35-45 feet. Further, since the flowline is not only relatively stiff but also relatively heavy, the forces involved in moving the flowline are relatively large. Thus, to pull the end portion of a flowline through a J-tube type or receiving funnel requires a pulling force on the order of 7,500 pounds for a smaller diameter flowline. The effect of such pulling forces is worsened by the fact that when the flowline end is hauled toward the wellhead or other installation, the lowered end of the flowline is not likely to be aligned with the received tube. In many cases, with the end of the flowline attached to one end of a wireline and lowered from a barge, the initial position of the wireline-attached flowline end may be almost anywhere along a 360° circle around the wellhead or other installation when the installation is at a great depth. Workers in the prior art have recognized such problems and the art has developed in a direction tending to solve them, as disclosed, for example, in the following United States patents:

U.S. Pat. No. 3,378,066, Otteman et al.
U.S. Pat. No. 3,298,092, Dozier et al.
U.S. Pat. No. 4,175,620, Nolan et al.

However, no method and apparatus provided by the prior art has proved fully satisfactory, particularly for subsea installations at great depths.

OBJECTS OF THE INVENTION

A general object of the invention is accordingly to devise an improved method and apparatus for installing and connecting underwater flowlines in such fashion as to minimize the adverse effects of the relative stiffness of the flowline and the large forces required as the end of the flowline is hauled into place at the underwater installation to which it is to be connected.

Another object is to achieve by remote operations a more accurate and dependable location of the flowline end at the wellhead or other installation to which the flowline is to be connected.

SUMMARY OF THE INVENTION

The invention is applicable to installation of flowlines, whether in the form of a single flowline or a bundle of flowlines, and connection of the flowline to any underwater installation which is equipped with guide lines extending from the installation to an operational base as the surface of the body of water. According to the invention, the existing guide lines and an appropriate guide arm unit are first employed to drill an upright hole in the floor of the body of water in a location adjacent the underwater installation. A support member such as a pile is then inserted into the hole so drilled, a guide arm unit again being employed to assure that the support member is lowered into the hole and located in an upright position with at least the upper end of the support member occupying a position predetermined with reference to the guide lines, the upper end of the support member being spaced significantly above the floor of the body of water. The support member is then cemented in place. A curved flowline-receiving member, typically a J-tube, is then lowered with the aid of a guide arm unit and secured to the upright support with one end of the flowline-receiving member opening generally horizontally away from the upright support and the other end of the flowline-receiving member opening upwardly in a predetermined location relative to the guide lines. One end of the flowline or flowline bundle is then hauled into the flowline-receiving member via the end of that member which opens away from the upright support and the entering end of the flowline is secured at the upwardly opening end of the flowline-receiving member so that that end of the flowline is in upright position. Again using a guide arm unit coating with the guide lines, a member, either an independent member such as a cross-over conduit or a member forming part of a unit such as a Christmas tree, is lowered to the installation and connected to the upright end of the flowline to place the flowline in communication with the underwater installation. Though in some embodiments the upwardly directed end of the flowline-receiving member, and thus of the hauled-in flowline, can be spaced laterally from the upright support, it is particularly advantageous to locate the upwardly directed end of the flowline-receiving member in substantially coaxial alignment with the top of the upright support. It is also advantageous to level the lowered flowline-receiving member, so that the upper end of the flowline will be truly vertical, before securing the flowline-receiving member to the upright support. Though in some embodiments the connection between the flowline-receiving member and the upright support locks the flowline-receiving member in a given rotational position, it is particularly advantageous to accomplish the connection in such fashion that the flowline-receiving member can rotate about the axis of the upright end of the flowline-receiving member.

IDENTIFICATION OF THE DRAWINGS

FIG. 9 is a vertical sectional view of the upper end of the flowline-receiving member with flowline, flowline connector and attached wireline and wireline connector forming part of the apparatus combination illustrated in FIGS. 6 and 7;

FIG. 13 is a view similar to FIG. 12 illustrating another embodiment of the invention.

DETAILED DESCRIPTION OF THE INVENTION

The Embodiment of FIGS. 1-11

Figure 1:
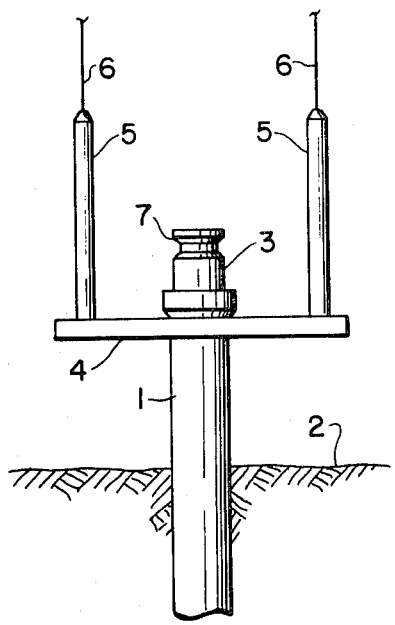
FIGS. 1-8 are semidiagrammatic side elevational views illustrating sequential stages of installation of a flowline and connection of the flowline to an underwater well installation according to one embodiment of the invention.

FIGS. 1-11 illustrate the invention as applied to installation of a flowline and connection of the flowline to the Christmas tree of an existing underwater well. As seen in FIG. 1, with drilling having been completed, such a well conventionally comprises surface casing 1 which projects upwardly above the floor 2 of the body of water, a wellhead lower body 3 being secured to the upper end of casing 1. A conventional guide means base 4 is rigidly secured to the wellhead and includes four upright guide arms 5, a guide line 6 being secured to each guide arm and extending upwardly to an operational base (not shown in FIG. 1) at the surface of the body of water, the guide arms and guide lines serving as a guidance system via which additional components of the well installation can be lowered into place as is well known in the art. Wellhead lower body 3 can be of any conventional configuration and includes a transverse annular outwardly opening locking groove 7.

Figure 2:
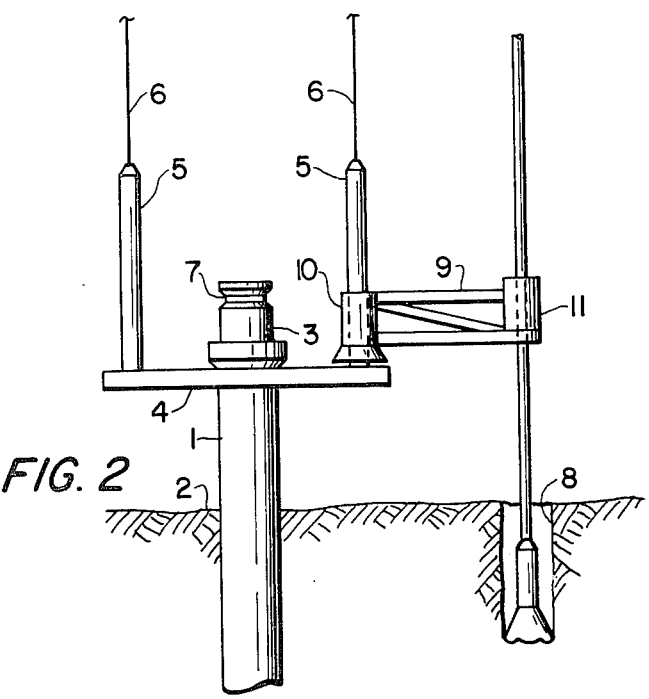

As a first step according to the invention, an upright hole 8, FIG. 2, is drilled in the floor or the body of water by conventional drilling procedures, using a guide arm unit 9 which includes guide funnels 10 each travelled down a different one of the guide lines 6 and slidably embracing the corresponding guide post 5 so that the conventional drilling guide 11 occupies a predetermined position relative to the guide lines and the position of hole 8 is therefore also predetermined with reference to the guide lines.

Figure 3:
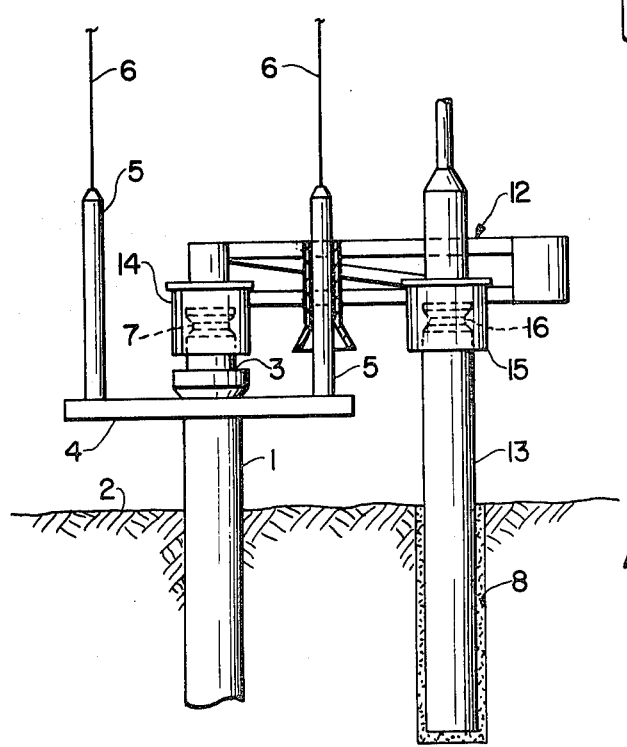

When hole 8 has been completed, the drill string and the guide arm unit 9 are recovered and a second guide arm unit 12, FIG. 3, is employed to lower a hollow pile 13 into hole 8 and, using conventional cementing practices and equipment, the pile is cemented in place. In addition to the usual guide funnels, unit 12 includes a conventional remotely operated connector 14 disposed to connect to the upper end of wellhead body 3 via locking groove 7. Guide arm unit 12 also includes a second conventional remotely operated connector 15 to connect the upper end of pile 13 to the guide arm unit via a locking groove 16 in a connector member fixed to the upper end of the pile. The pile thus depends approximately vertically from the guide arm unit and enters hole 8 as the guide arm unit is landed, and the guide funnels of the guide arm unit and connector 14 coact to place the guide arm unit in approximately horizontal position when unit 12 is landed as seen in FIG. 3, the upper end of the pile thus being at least approximately vertical and occupying a precisely predetermined location relative to the guide lines. After cementing has been completed so that the pile is rigidly secured in hole 8, connectors 14 and 15 are remotely released and the guide arm unit and cementing equipment is recovered.

Figure 4:
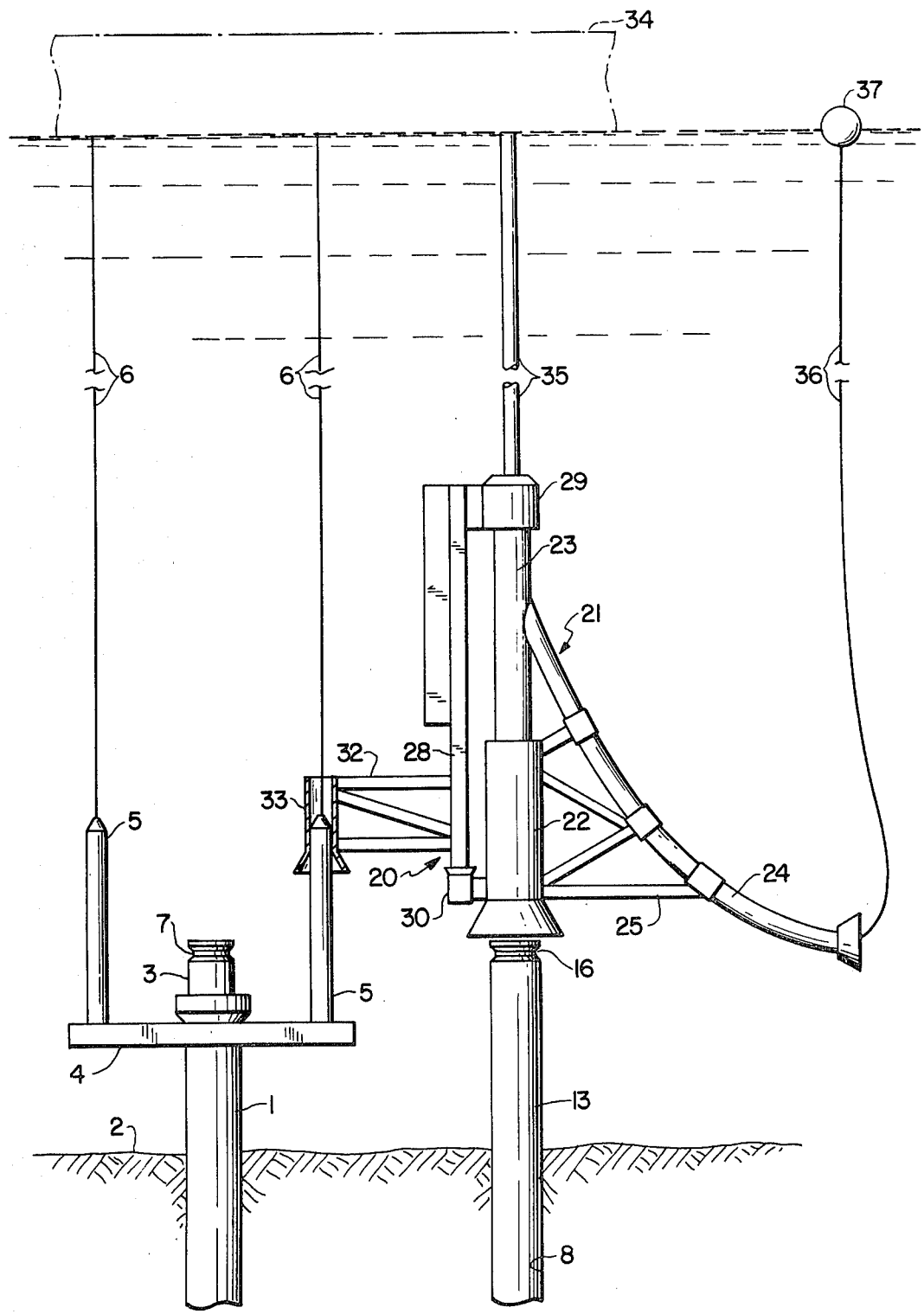
Figure 10:
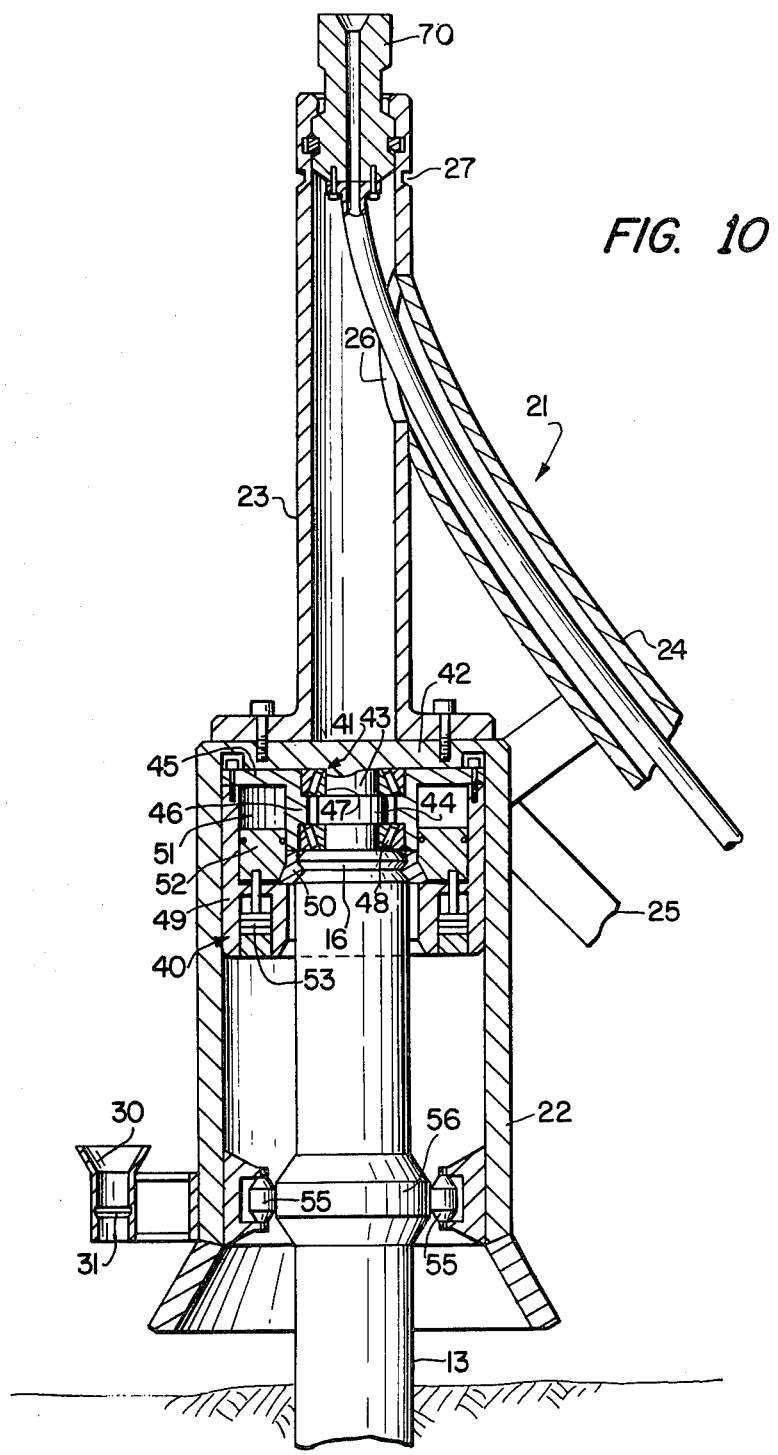
FIG. 10 is a vertical sectional view showing in greater detail a portion of the apparatus of FIG. 7.
Figure 11:
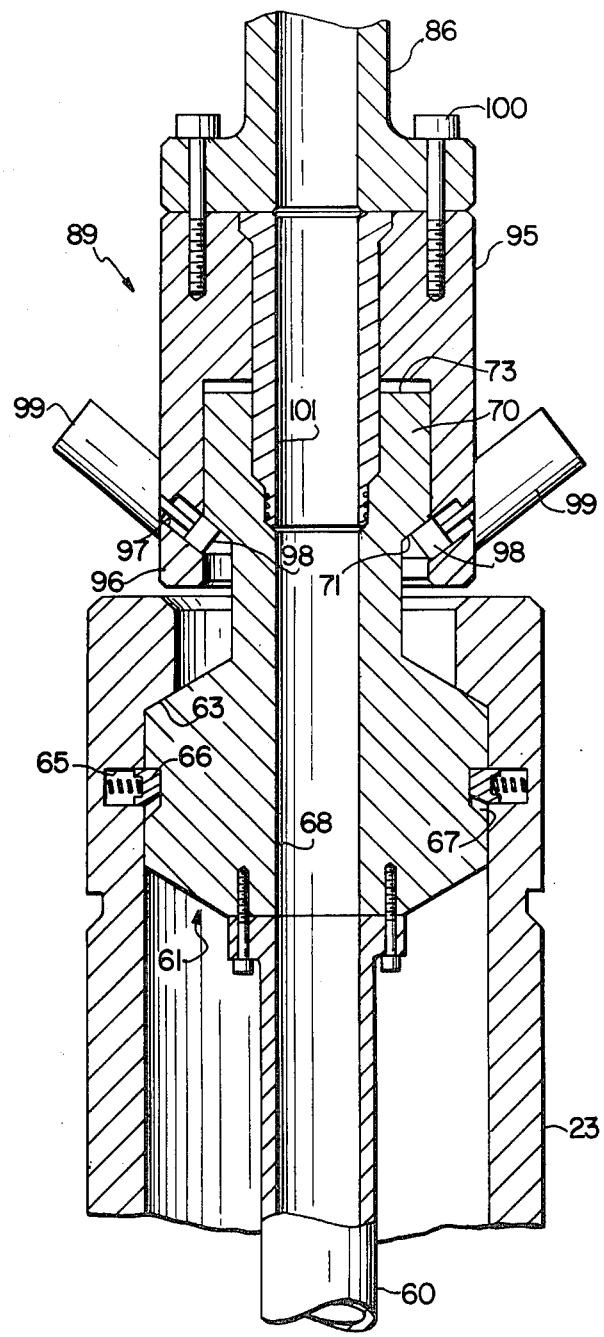
FIG. 11 is a vertical sectional view showing in greater detail a portion of the apparatus of FIG. 8.

Proceeding now in accordance with FIG. 4, a third guide arm unit, indicated generally at 20, is employed to lower a flowline-receiving unit 21 onto pile 13 and secure unit 21 to the pile. Unit 21 includes a tubular base member 22 of an inner diameter such as to be capable of being lowered onto the upper end portion of pile 13, a tubular member 23 rigidly secured to the upper end of base member 22 and projecting upwardly therefrom, and a curved flowline-receiving member 24 having its upper end welded to member 23 and its elongated main body secured to the base member by rigid support frame 25. As seen in FIG. 10, the upper end of member 24 communicates with the interior of member 23 via a lateral opening 26 and the curved form of member 24 and the position of that member relative to member 23 are such that an axial line following the curve of member 24 can be continued within member 23 to project upwardly in coincidence with the vertical central axis of member 23. Thus, when unit 21 is disposed as seen in FIG. 4, member 24 and the upper end portion of member 23 combine to form a flowline receiver one end of which opens generally horizontally away from base 22 and the other end of which opens vertically upwardly.

Figure 6:
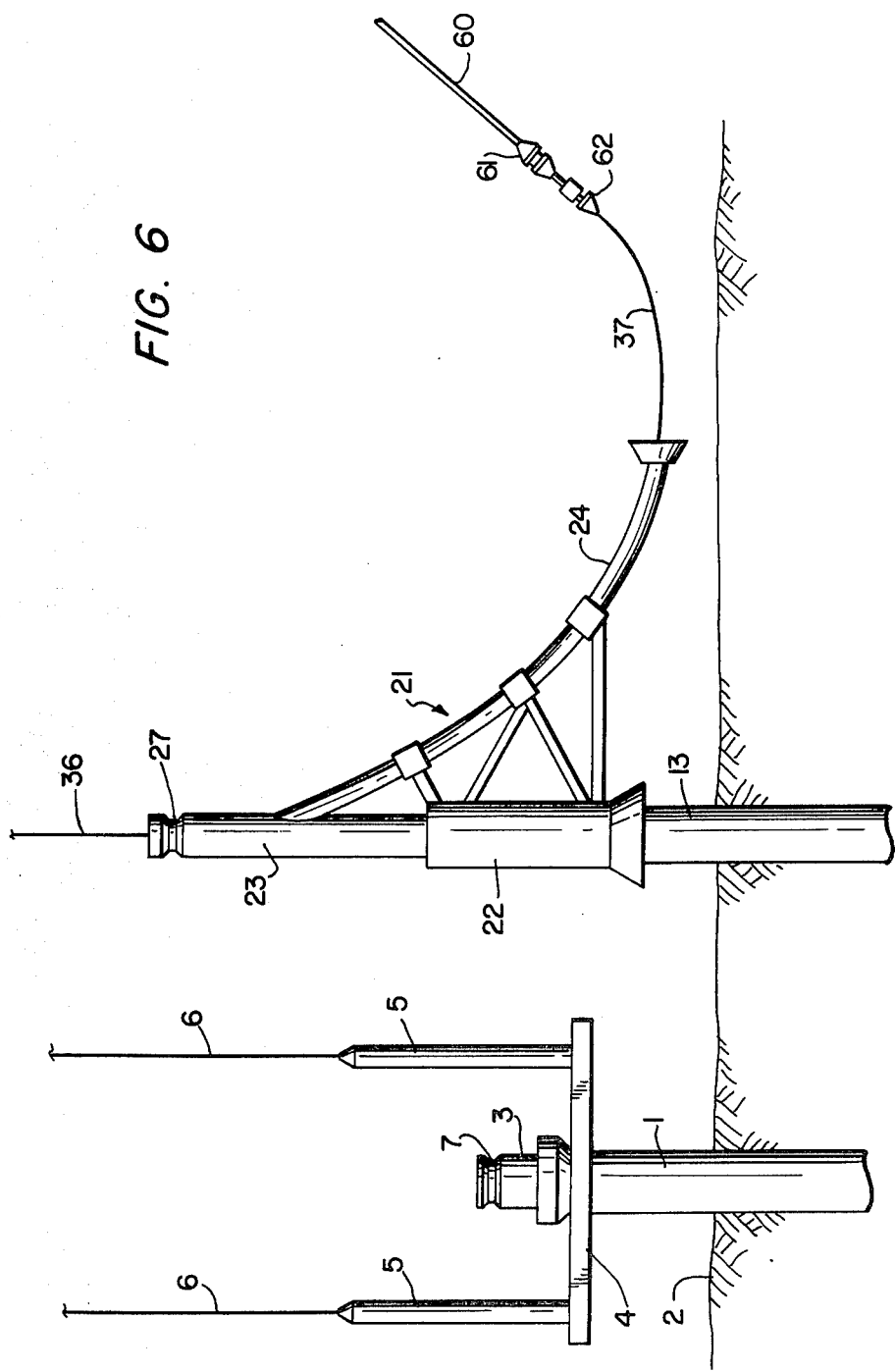
Figure 7:
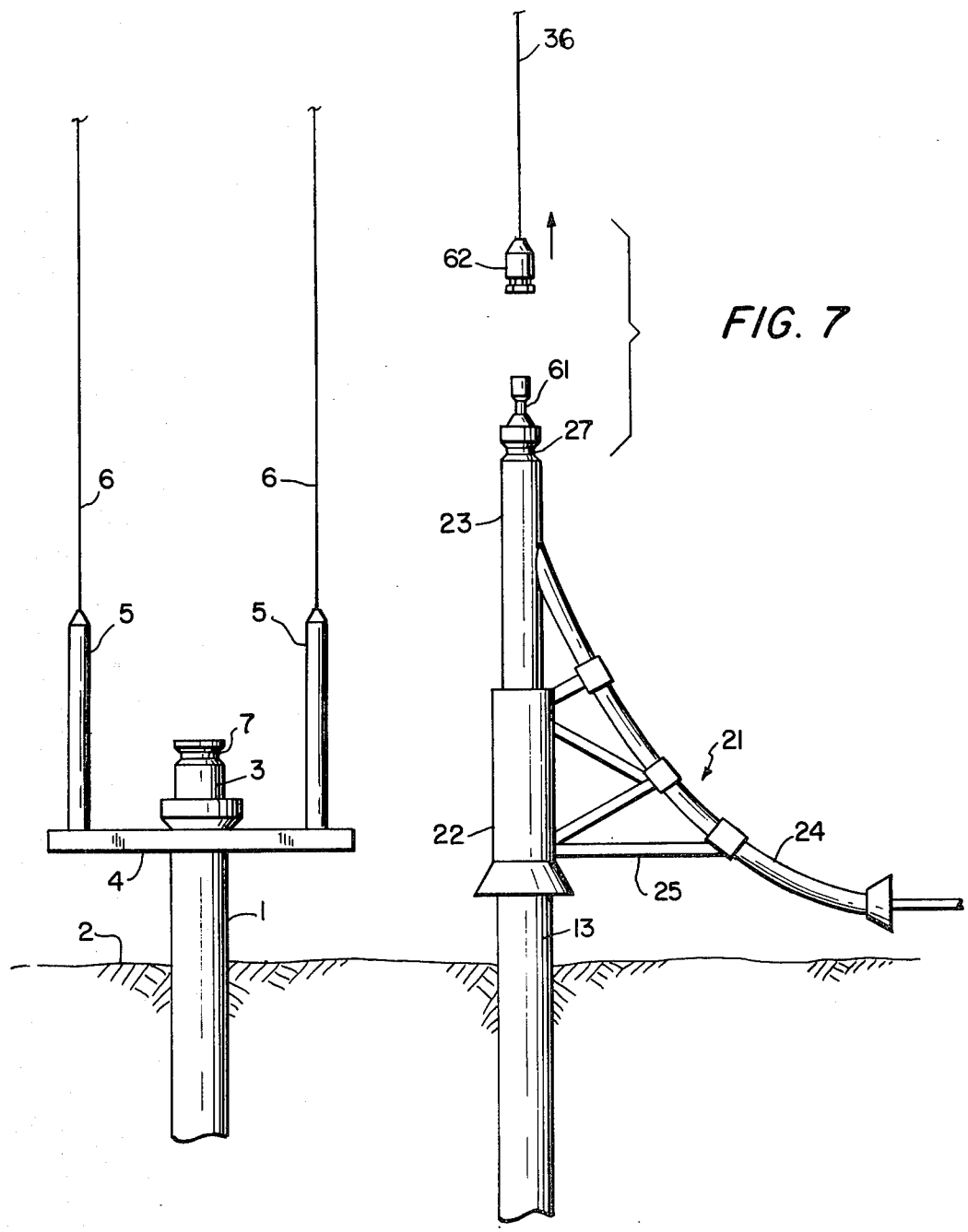

The upper end of member 23 is provided with a transverse annular outwardly opening locking groove 27 FIG. 6. Guide arm unit 20 includes an elongated vertical frame member 28 to the upper end of which is fixed the female member 29 of a conventional remotely operated connector having a locking device capable of coacting with groove 27 to releasably secure unit 21 to the guide arm unit. The lower end of frame member 28 projects downwardly into a receptacle 30 carried by base member 22 and is releasably retained in the receptacle, as by shear pins (not shown) engaged in an internal groove 31, FIG. 10, in the wall of the receptacle. Adjacent its lower end, frame member 28 is connected to a rigid lateral frame unit 32 carrying guide funnels 33 to coact with guide lines 6 as the assembly is lowered from operational base 34 and with guide posts 5 as the assembly is landed. The total weight of member 28 and frame 32, with added counterweight as necessary, balances the weight of member 24 and frame 25. A tubular handling string 35 is connected to connector 29 for manipulation of the combination of units 20,21. A wireline 36 is run through the flow line receiver before units 20,21 are lowered, one end of the wireline being connected to the lower end of the handling string and the other end being connected to buoy 37, FIG. 4.

Figure 5:
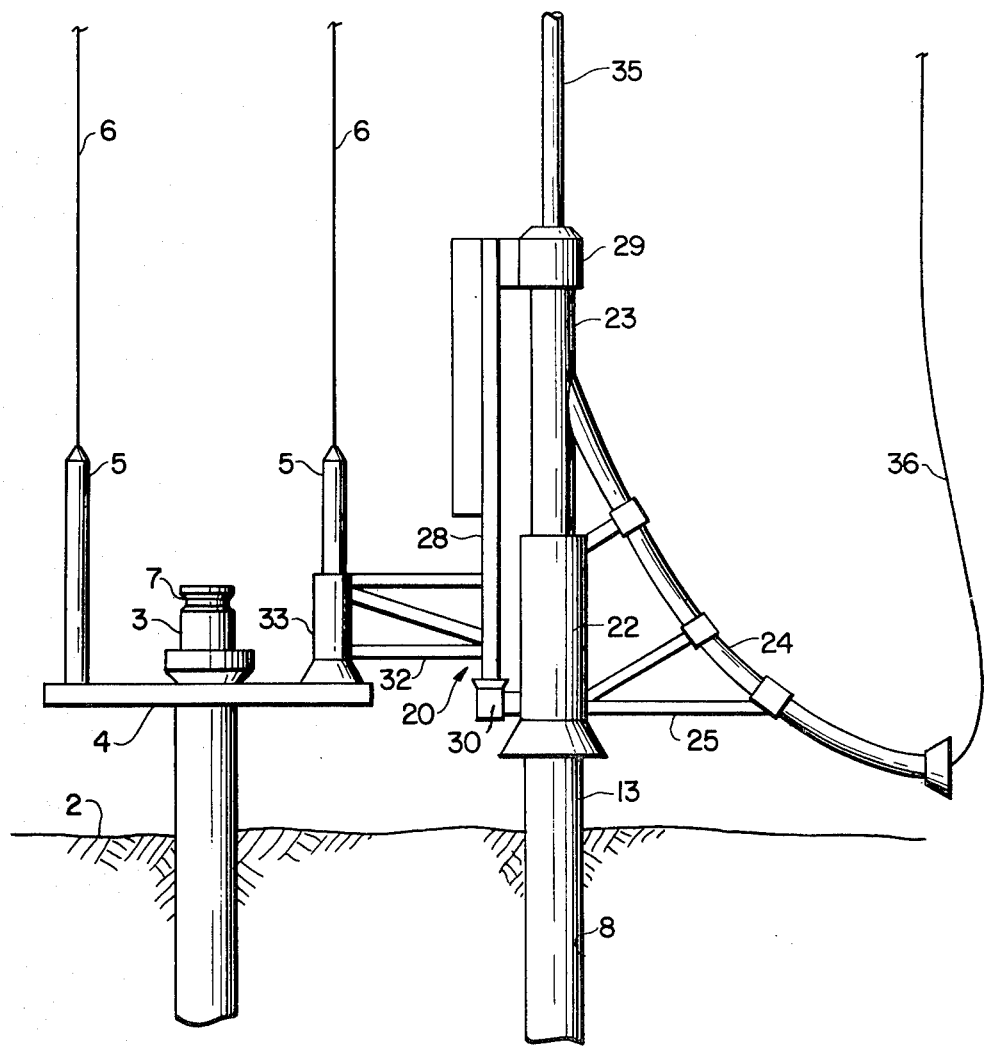

As the combination of units 20,21 is landed, units 20,21 proceed from the position seen in FIG. 4 to that shown in FIG. 5, with base member 22 then engaging pile 13 in the manner shown in FIG. 10. Upon landing, base member 22 is locked to pile 13 against axial movement relative to the pile by a remotely operated connector indicated generally at 40, FIG. 10, but remains free to rotate about the vertical axis defined by the X-roller bearing indicated generally at 41. At its upper end, member 22 includes a transverse portion 42 from which an integral centrally located shaft portion 43 depends, the shaft portion including an intermediate transverse annular outwardly projecting enlargement 44. Connector 40 includes a first housing member 45 having a tubular dependent hub including a transverse annular inwardly projecting flange 46 directed toward enlargement 44. Thus, housing member 45 of the connector and portion 42 of member 22 combine to define an upper annular space which accommodates upper bearing member 47 and a lower annular space which accommodates lower bearing member 48. Secured to and depending from the outer periphery of housing member 45 is a second housing member 49, the two housing members combining to define a transverse annular opening which slidably accommodates a resilient metal split ring 50. The cross section of ring 50 is such that the inner portion thereof can be accommodated in locking fashion by groove 16 while the other portion thereof presents a frustoconical upwardly and inwardly tapering cam follower face. Housing members 45 and 49 also combine to define an annular upper cylinder 51 which slidably accommodates an annular piston 52 which has, at its lower end, an inwardly facing upwardly and inwardly tapering cam surface dimensioned and disposed to coact with the outer cam follower face of the split ring 50 to drive ring 50 inwardly into locking engagement in groove 16 when piston 52 is driven downwardly relative to the connector housing. The lower end portion of housing member 49 defines a circumferentially spaced series of upright cylinders each accommodating a piston 53 having a shaft which projects upwardly through a suitable bore to be received in a downwardly opening recess in the lower end of piston 52. Appropriate hydraulic ducting (not shown) is provided to supply fluid under pressure from a source at the operational base to cylinder 51 to drive piston 52 downwardly to lock the connector after landing of units 20,21 on the pile, and to drive pistons 53 upwardly to release the connector when unit 21 is to be recovered. A small free space is provided between the connector housing and member 22 so that unit 22 can turn freely on the X-bearing 41 after connector 40 has been locked. In this embodiment, a plurality of rollers 55 are mounted on the right cylindrical main body portion of member 22, the rollers being spaced circumferentially and arranged for free rotation about axes parallel to the longitudinal axis of member 22, as shown, the rollers acting either on the outer surface of the pile or on a track 56, FIG. 10, provided by a ring added to the pile, so as to stabilize member 22 to rotate about the longitudinal axis of the pile.

At this stage, buoy 37 and the attached end of wireline 36 are recovered, the buoy is detached from the wireline, and with the flowline supported on a lay barge (not shown) in conventional fashion, the off-running end of the flowline 60 is attached to the end of the wireline by the combination of flowline connector 61 and a releasable connector 62, FIGS. 6 and 9. Connector 29 is then released and guide arm unit 20 is recovered by manipulation of handling string 35, wireline 36 being hauled through the flowline receiver because the wireline is attached to the handling string, so that flowline 60 is hauled toward and into the flowline receiver, as will be apparent from FIG. 6. As shown in FIG. 9, the upper end of member 23 of the flowline receiving unit has a transverse annular frustoconical inner shoulder 63 which tapers upwardly and inwardly. Flowline connector 61 includes a hub 64 having a right cylindrical outer surface which is of a diameter only slightly smaller than the inner diameter of member 22 so that hub 64 is slidably received in member 23 after passing through member 24. The leading end of hub 64 is frustoconical, presenting a surface which comes into flush engagement with shoulder 63 as the flowline reaches the end of its travel through the receiver. Member 23 has a transverse annular inwardly opening groove 65 accommodating a plurality of conventional latch segments 66 which are spring-urged inwardly. Hub 64 has a transverse annular outwardly opening groove 67 so spaced below shoulder 63 that segments 66, having first been cammed outwardly by the leading end of the hub, will snap into groove 67 when the leading end of the hub seats against shoulder 63. Thus, once flowline 60 has been fully hauled in by wireline 36, connector 61 is securely and automatically latched to member 23 and serves to present an upwardly opening end for the flowline since the connector has a through bore 68 of the same diameter as the bore of the flowline.

The upper end portion 70 of connector member 61 projects well beyond the end of member 23 and presents a downwardly directed downwardly and inwardly tapering frustoconical shoulder 71 and a right cylindrical outer surface portion 72 which extends from shoulder 71 to the flat transverse annular upper end face 73 of the connector. Releasable connector 62 serves to releasably connect wireline 36 to connector member 61 and comprises a main body 74, a plurality of locking dogs 75 and a locking sleeve 76 which surrounds the locking dogs and is axially movable between the active position shown in FIG. 9 and a releasing position. Body 74 has a transverse annular outwardly opening groove 77 which retains the inwardly offset upper ends 78 of the locking dogs, the upper side wall of groove 77 being outwardly extended to provide a stop surface to limit upward travel of sleeve 76, thus determining the releasing position for the sleeve. Sleeve 76 has an outwardly opening transverse annular groove 79 to be engaged by an overshot to accomplish movement of the locking sleeve to its releasing position by remote operation, the tapered form of shoulder 71 then assuring that the locking dogs will be cammed outwardly to release the wireline from the flowline in response to a strain applied to the wireline. Thus, when the flowline has been fully hauled in by the wireline, the wireline can be disconnected remotely and retrieved, leaving the upwardly projecting end 70 of flowline connector 61 fully exposed as will be clear from FIGS. 7 and 10.

Figure 8:
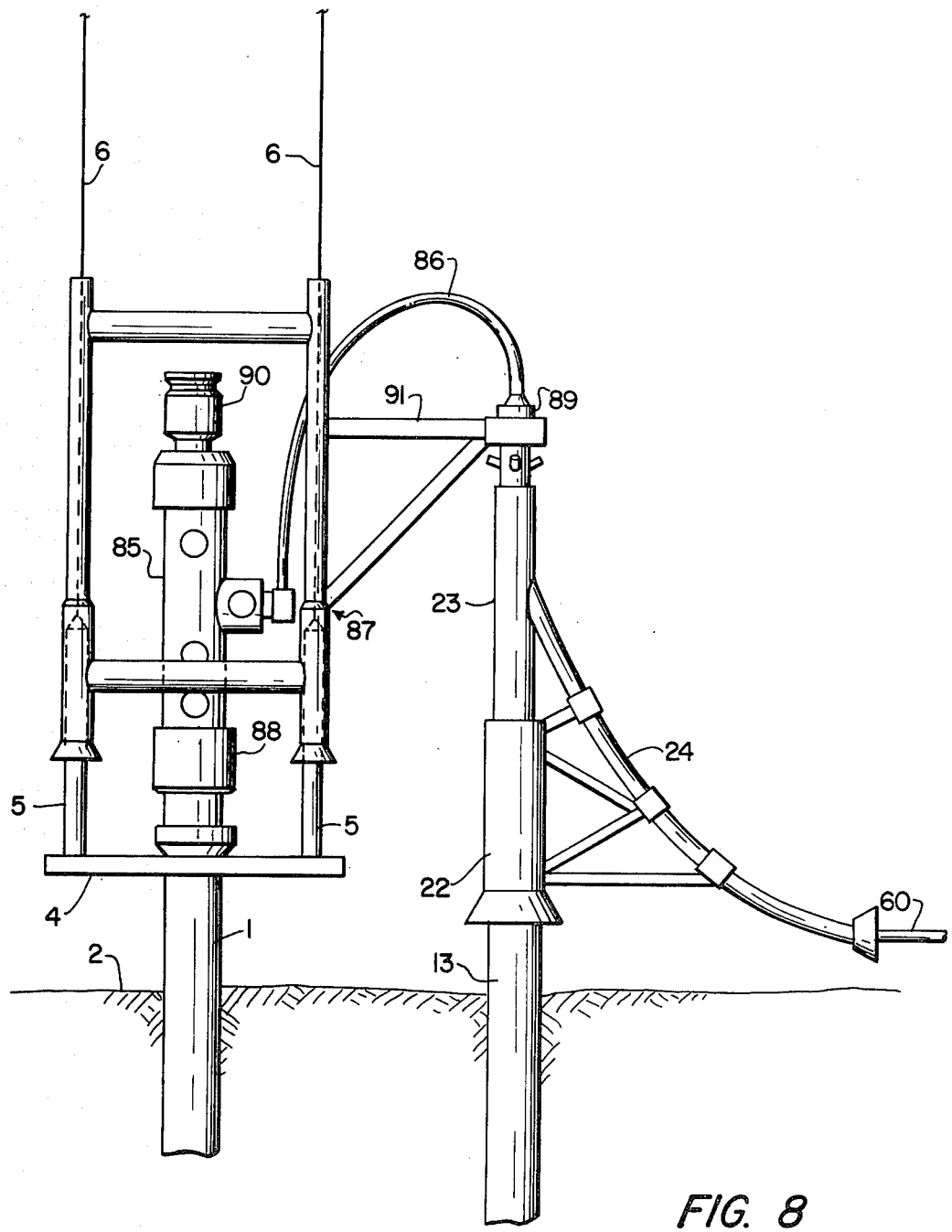

With the flowline now having been hauled in and secured with its upper end in a predetermined location relative to the guide lines, the combination of a production tree 85, FIG. 8, and cross-over conduit 86 is now lowered into place, using a conventional guide arm unit 87 to guide the production tree and cross-over conduit until the female connector member 88 of a conventional remotely operated connector at the base of the tree lands on wellhead body member 3 and is locked thereto via groove 7 and a female connector member 89 at the outer end of conduit 86 lands on and is locked to the exposed upper end 70 of flowline connector 61 so that the flowline 60 is in communication with the well and the underwater assembly has been completed. Lowering of the tree and cross-over conduit can be accomplished conventionally with a handling string (not shown) releasably attached to the upper end of the tree by a conventional remotely operated connector including the male connector member 90, so that the handling string can be disconnected and recovered after completion of the installation. So far as guidance of the production tree itself is concerned, guide arm unit 87 can be conventional. Connector member 89 is carried by a guide frame 91 which projects laterally from the guide arm unit to maintain member 89 in that position which will be vertically aligned with connector 61 as the tree and cross-over conduit land. Connector member 89 can be of any type capable of locking to the flowline connector by engagement with shoulder 71. In this embodiment, connector 89 comprises a main body 95 FIG. 11 having a dependent annular skirt 96 capable of telescopic engagement over portion 70 of flowline connector 61, the skirt being provided with a downwardly and inwardly opening slot 97 which tapers at the same angle as does shoulder 71 and in which are slidably disposed a plurality of arcuate locking segments 98 actuated by remotely controlled power cylinders 99, the arrangement being such that, once connector 89 has landed in the manner seen in FIG. 11, actuation of the power cylinders in one sense will drive segments 98 inwardly into engagement beneath shoulder 71, while actuation of the power cylinders in the opposite sense will retract the segments and release the connector. Cross-over conduit 86 is secured to the upper end of body 95, as by screws 100, so that the bore of conduit 86 communicates with the through bore of a stinger 101 carried by body 96, as shown, the arrangement being such that, as the connector is made up, the stinger enters and is sealingly accommodated by an appropriately enlarged portion of the bore through the body of flowline connector 61.

Figure 12:
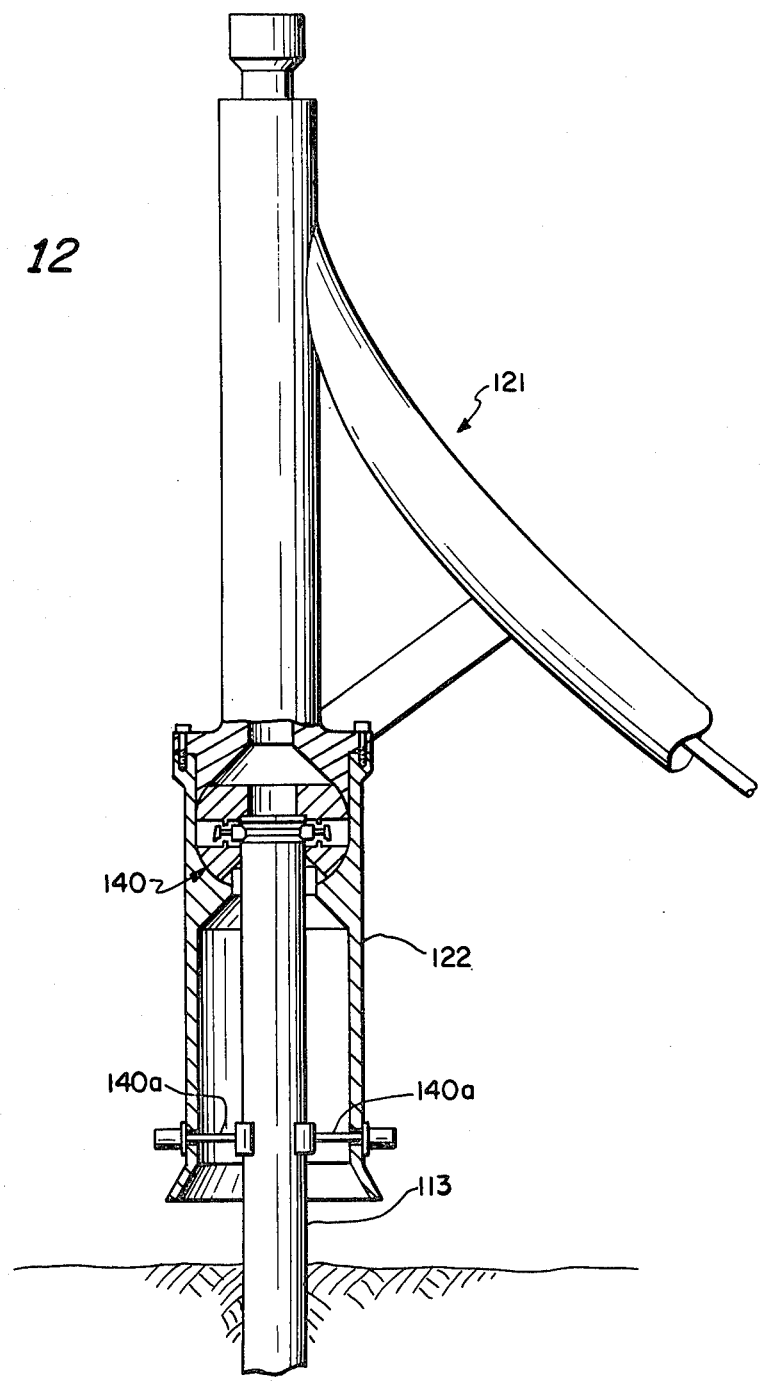
FIG. 12 is a view, partly in vertical cross section and partly in side elevation, of an upright support member and flowline-receiving member according to another embodiment of the invention.

The Embodiment of FIG. 12

The embodiment described with reference to FIGS. 1-11 depends upon vertical installation of pile 13 in order to achieve truly vertical disposition of flowline connector 61. When vertical installation of the pile is not achieved, base member 122, FIG. 12, of the flowline receiving unit 121 can be connected to pile 113 by a ball-and-socket type connector 140 constructed as described in detail in my copending application Ser. No. 326,330 and the flowline receiving unit can be allowed to level itself gravitationally, power-operated locking units 140a then being operated remotely to lock unit 121 to the pile while unit 121 is in its levelled position.

The Embodiment of FIG. 13

While it is particularly advantageous to have the upper end of the flowline receiver centered on a vertical axis extending through the center of the top of the pile, as described in the foregoing embodiments, the upper end of the flowline receiver can be offset laterally from the pile, the apparatus of FIG. 13 being typical for this embodiment of the invention. Here, the base 222 of the flowline receiving unit 221 is mounted on pile 213 in any of the fashions hereinbefore described but the top of base 222 is simply provided with an upwardly projecting grooved hub 222a to which the remotely releasable connector (not shown) of a conventional handling string can be attached to accomplish lowering of unit 221. Curved flowline-receiving member 224 is rigidly mounted on base 222 by frame 225, the frame including an upper frame member 225a rigidly connected to a hub 224a forming the upper end of receiving member 224, frame member 225a being of such length and so constructed as to maintain hub 224a in a predetermined location spaced laterally from the vertical central axis of hub 222a so that, when unit 221 is lowered with the aid of a conventional guide arm unit coacting with the guide lines of the underwater assembly, predetermination of the location of hub 222a by the guide arm unit will also predetermine the location of hub 224a. Flowline 260 is hauled into the flowline receiving member 224a in the same manner hereinbefore described, with flowline connector 261, secured to the leading end of the flowline, latching automatically within hub 224a with the upper end 270 of connector 261 projecting vertically upwardly from hub 224a, as shown.

In all embodiments of the invention, the locations of both the upright support member, such as the cemented pile illustrated, and all of the flowline guiding and receiving components are predetermined with reference to the existing guidance system of the underwater installation to which the flowline is to be connected, but no forces developed during haul in and positioning of the flowline are applied to the installation. Thus, once the pile has been installed, all forces required for hauling in the flowline are applied to the wireline and to the pile. In all embodiments, upright disposition of the upper end of the flowline and its flowline connector is assured, and it is also assured that the upright end of the flowline will occupy a precisely predetermined position with reference to the guidance system and, therefore, with reference to the underwater installation.

What is claimed is:
1. A method for installing an underwater flowline and connecting the flowline to an existing underwater installation equipped with guide lines extending from the underwater installation to an operational base at the surface of the body of water, comprising
   drilling an upright hole in the floor of the body of water by employing a guide arm unit coacting with the guide lines to position drilling apparatus to drill the hole in a predetermined location adjacent the underwater installation;
   inserting a support member in the hole by remote operations carried out with a guide arm unit coact- ing with the guide lines to insert the support member in the hole and maintain the support member in upright position with the upper end of the support member spaced above the floor of the body of water;

cementing the upright support member in the hole;

lowering onto the upright support member with the aid of a guide arm unit coacting with the guide lines a flowline-receiving unit including a curved flowline-receiving member and securing the flowline-receiving unit to the upright support member with one end of the flowline-receiving member opening generally horizontally away from the support member and the other end of the flowline-receiving member opening upwardly in a predetermined location relative to the guide lines;

hauling one end of the flowline into the flowline-receiving member via said one end of the flowline-receiving member and securing said one end of the flowline at said other end of the flowline-receiving member in upright position; and lowering to the underwater installation with the aid of a guide arm unit coacting with the guide lines and connecting to said upright end of the flowline a member which places the flowline in communication with the underwater installation.

2. A method according to claim 1 and further comprising adjusting the flowline-receiving unit relative to the upright support member until the upwardly opening end of the flowline-receiving member is vertical.

3. A method according to claim 2, wherein the step of lowering the flowline-receiving unit onto the upright support member is carried out to center the upwardly opening end of the flowline-receiving member relative to the upper end of the upright support member.

4. A method according to claim 1, wherein the upwardly opening end of the flowline-receiving member occupies a predetermined position spaced laterally from the top of the upright support member.

5. A method according to claim 1, wherein the flowline-receiving unit includes a downwardly opening hollow member and the step of lowering the flowline-receiving unit onto the upright support member is carried out to cause the downwardly opening hollow member to generally telescopically receive the upright support member.

6. A method according to claim 5 and further comprising adjusting the flowline-receiving unit relative to the upright support member until the upwardly opening end of the flowline receiving member is vertical; and then securing the downwardly opening hollow member to the upright support member to secure the flowline-receiving unit in its adjusted position.

7. A method according to claim 1, wherein the step of securing the flowline-receiving unit to the upright support member is carried out to allow the flowline-receiving member to swing about an upright axis which passes through the upper end of the upright support member.

* * * * *